April 17, 1934. J. C. KNUPP 1,955,074
CONNECTING SLEEVE
Filed May 31, 1930 2 Sheets-Sheet 1
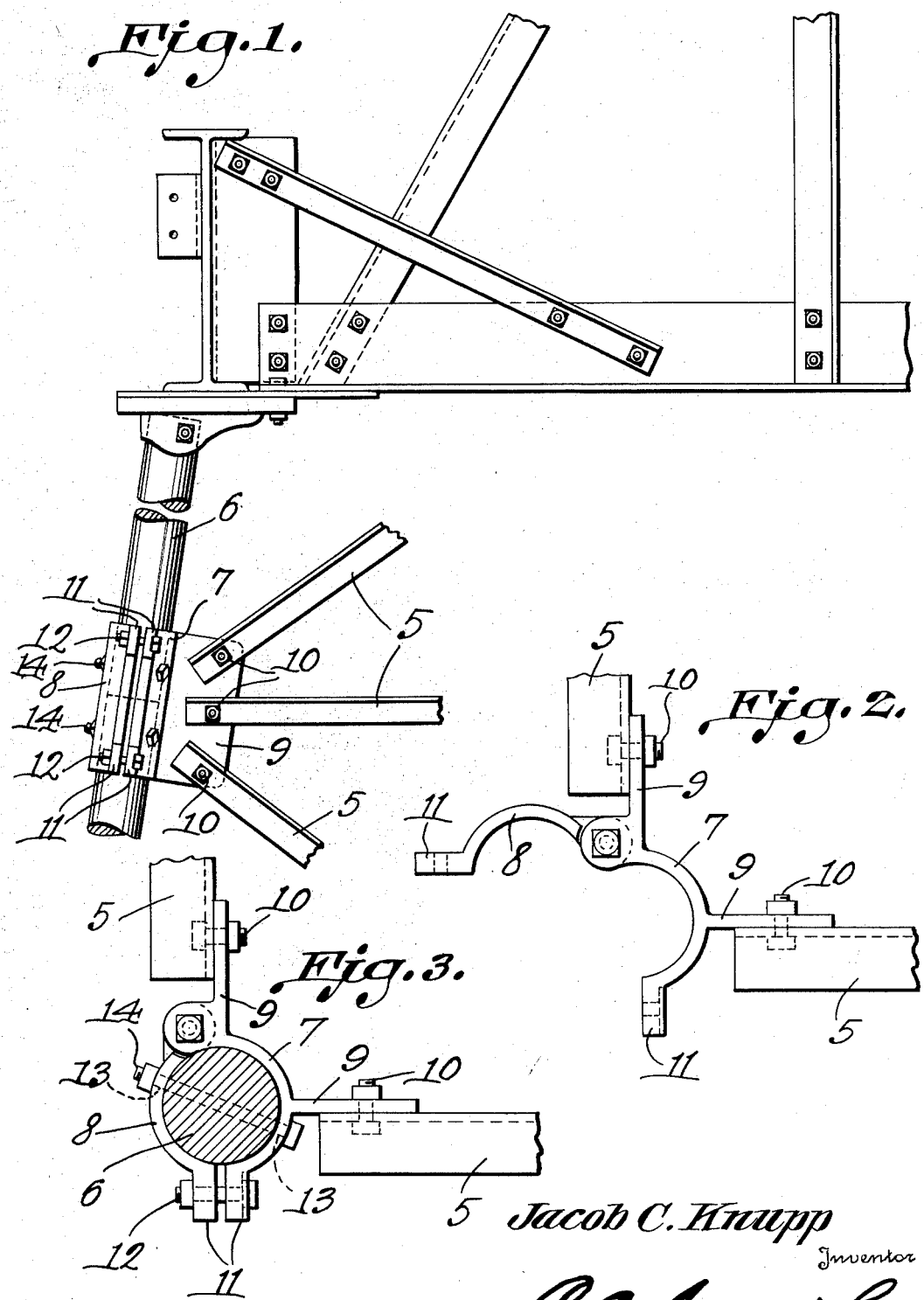
Jacob C. Knupp
Inventor
By C. A. Snow & Co.
Attorneys.

April 17, 1934.  J. C. KNUPP  1,955,074
CONNECTING SLEEVE
Filed May 31, 1930   2 Sheets-Sheet 2
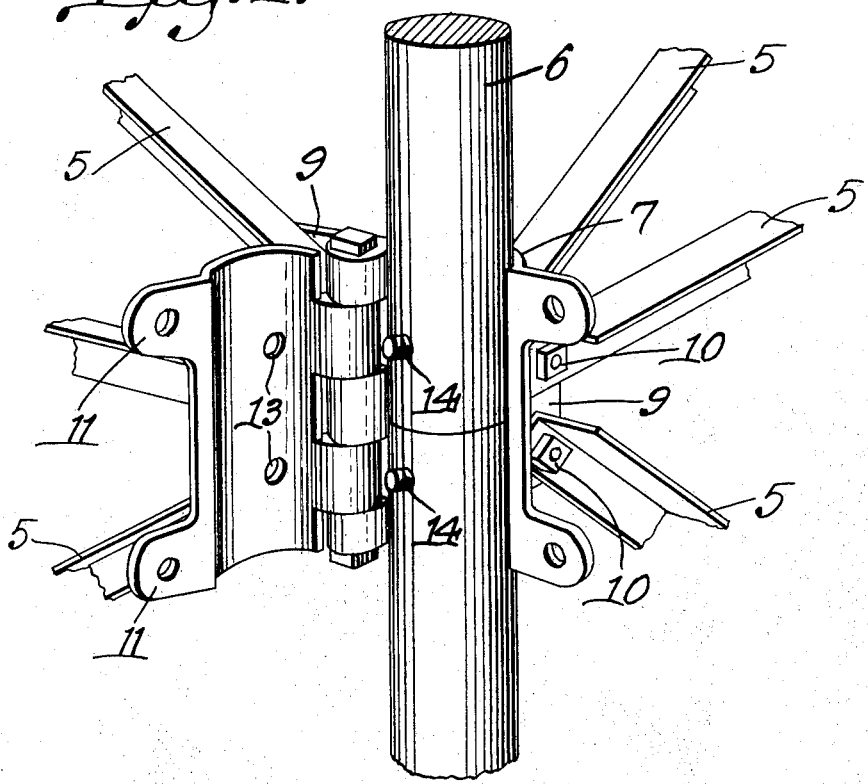
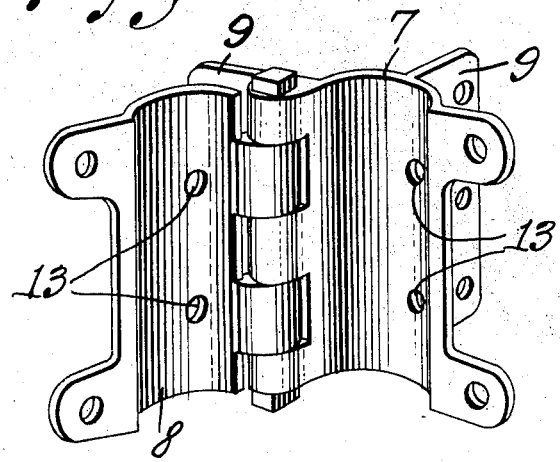
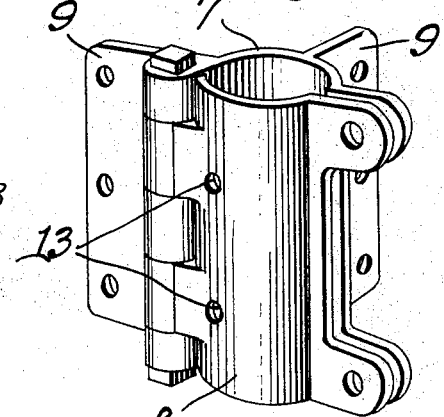

Patented Apr. 17, 1934

1,955,074

UNITED STATES PATENT OFFICE 1,955,074

CONNECTING SLEEVE

Jacob C. Knupp, Augusta, Kans.

Application May 31, 1930, Serial No. 458,619

1 Claim. (Cl. 189—19)

This invention relates to a union or sleeve designed primarily for use in clamping or securing the meeting ends of leg sections used in the construction of metal towers, derricks or the like.

A further object of the invention is to provide a removable sleeve which may be employed in connecting the braces or girts of a derrick or tower construction, to the leg sections.

A still further object of the invention is the provision of a sleeve of this character which may be readily and easily removed or replaced should it be desired to repair or replace a bent or kinked leg member, eliminating the necessity of removing the girts and braces to replace the defective element.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating the application of the sleeve, constructed in accordance with the invention.

Figure 2 is a plan view thereof, showing the sleeve in an open position.

Figure 3 is a plan view illustrating the sleeve as clamped around the leg of a derrick.

Figure 4 is an enlarged perspective view illustrating the clamp and manner of positioning it.

Figure 5 is a perspective view of the clamp or sleeve in an open position.

Figure 6 is a perspective view of the clamp or sleeve in its closed position.

Referring to the drawings in detail, the reference character 5 designates braces or girts of a derrick construction, of which the leg members 6 form a part, the leg members being shown as having their meeting ends secured together by means of the clamp or sleeve, forming the subject matter of the present invention.

This sleeve embodies a main section 7 and a section 8 pivotally connected thereto, the sections 7 and 8 being curved so that when they are brought together, they will provide a circular clamp or sleeve to closely fit the leg sections connected by the clamp or sleeve.

Formed integral with the section 7 are substantially wide flanges 9 that extend in opposite directions so that the braces and girts of the derrick construction may be secured thereto, as by means of the bolts 10. Apertured ears 11 are formed on the sections and are adapted to receive bolts 12 that are employed for securing the sections together when the sleeve is clamped around the leg members of a derrick construction.

Openings 13 are formed in the sections 7 and 8, and accommodate bolts 14 that extend through openings in the adjacent ends of meeting leg sections, to clamp them together in such a way as to provide an exceptionally strong and rigid construction.

From the foregoing it will be obvious that due to the construction shown and described, a bent or damaged leg section may be readily and easily removed by merely loosening the sleeve or clamp and swinging the pivoted section thereof outwardly.

The removal of a leg section may be accomplished without the necessity of removing the braces or girts of the derrick.

I claim:

A clamp for clamping the adjacent ends of rods, securing the rods together, comprising inwardly connected wide curved members adapted to fit around the rods, flanges formed integrally with one of the sections only and extending therefrom at right angles with respect to each other, said flanges providing means to which girders are secured, said curved members having openings aligning with openings in the rods with which the clamp is used, bolts extending through the aligning openings and cooperating apertured ears on the members adapted to receive bolts for securing the members in position on the rods.

JACOB C. KNUPP.